73-658 SR
XR 2,870,430
SEARCH ROOM

CROSS REFERENCE SUBSTITUTE FOR MISSING XR

Jan. 20, 1959 R. D. HANCOCK 2,870,430

DISTORTION INDICATOR

Filed Aug. 9, 1952

INVENTOR:
Robert D. Hancock

By Herbert E. Metcalf
HIS PATENT ATTORNEY

United States Patent Office 2,870,430

Patented Jan. 20, 1959

2,870,430

DISTORTION INDICATOR

Robert D. Hancock, Compton, Calif., assignor to Northrop Aircraft, Inc., Hawthorne, Calif., a corporation of California Application August 9, 1952, Serial No. 303,627

5 Claims. (Cl. 340—149)

This invention relates to distortion measurements in electronic recordings and, more particularly, to means for simultaneously comparing an original signal with the same signal after being recorded and reproduced.

The reproduction of a signal from a recording sensed by a read head, for example, is subject to various forms of distortion. Among these various types of distortion are frequency distortion, amplitude distortion and noise distortion. Such distortions can be effected by speed of rotation or of travel of the recording medium, eccentricity of the shaft rotating the recording medium, and imperfections such as non-uniformity of the sensitive coating.

It would be highly advantageous to obtain accurate measurements of the magnitude of such distortion.

It is, accordingly, an object of this invention to provide means for accurate measurement of the magnitude of distortion in a signal reproduced from a previously recorded signal.

It is a further object of this invention to provide means for monitoring the difference between a signal applied to a recording means and a signal detected by a reproducing means.

The invention utilizes a reproducing device positioned on a recording medium at a known distance from a recording means. The recording medium is driven past the recording means and the reproducing means at a known constant velocity. A signal voltage applied to the recording means is also applied to a time delay device whose time of delay of the signal is equal in magnitude to the time of transit of the recording medium from the recording means to the reproducing means. The output from the time delay device and also the output from the reproducing means are simultaneously applied to a peak reading differential voltmeter, an electronic switch and oscilloscope, or to a similar arrangement in order to provide indication of distortion resulting during the recording and the reproducing process.

Previously enumerated objects and features will be more fully understood and other objects will be made apparent by reference to the following detailed description viewed in conjunction with the accompanying drawings wherein.

Figure 1:
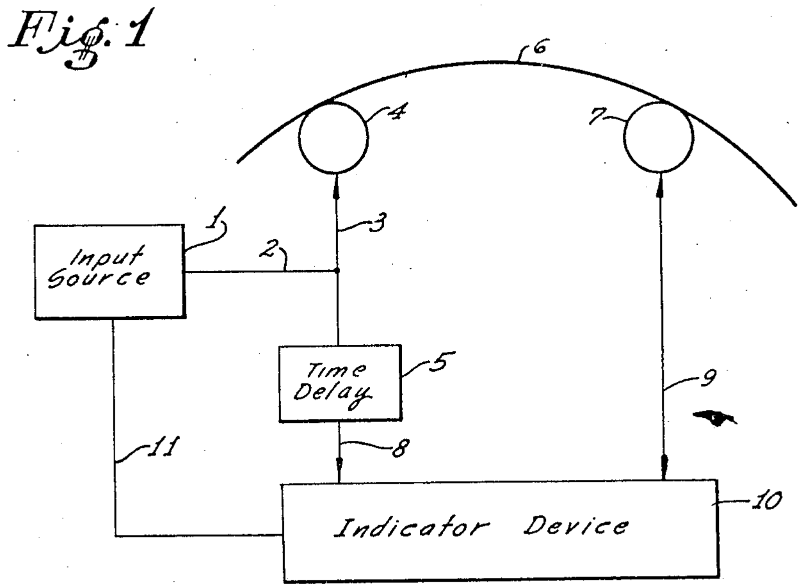
Figure 1 is a block diagram illustrative of the fundamental principle of the invention.

General operation of the invention is indicated in the block diagram comprising Figure 1. Output from input source 1 is conveyed via leads 2 and 3 to recording means 4—a magnetic head, for example. Output from source 1 is also conveyed via leads 2 and 3 to time delay device 5. Recording medium 6—a magnetic tape, for example, is assumed to travel at essentially a constant speed past recording means 4 and reproducing means 7. The purpose of time delay 5 is to provide for delay of a signal from source 1, the time of this delay being equal to the time of travel of recording medium 6 between recording means 4 and reproducing means 7. Time delay device 5 is preferably an electronic circuit possessing a minimum of inherent distortions. A suitable delay circuit of this type is described and illustrated in section 7, page 2 of "Textronix" oscilloscope 511A instruction manual. Output from time delay 5 and the output from reproducing means 7 are conveyed via leads 8 and 9, respectively, to indicator device 10—a peak reading differential voltmeter, for example; the purpose of this voltmeter is to indicate a difference voltage existing between input 8 and input 9; output 11 from indicator device 10 is used to provide automatic gain control of input source 1.

It is apparent to those skilled in the art that the general embodiment of the invention disclosed in Figure 1 is subject to many modifications or equivalents; for example, indicator device 10 can be an electronic switch.

Figure 2:
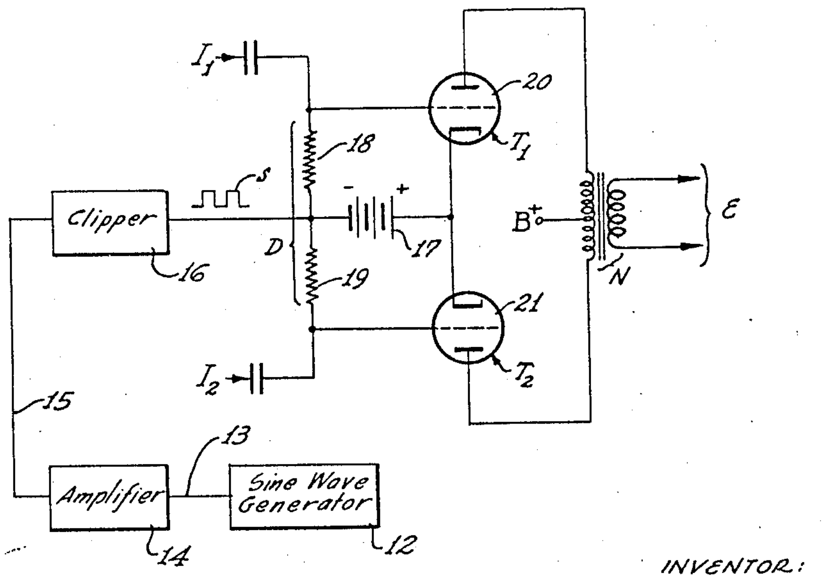
Figure 2 is a combination block-schematic diagram of a preferred embodiment of an indicator device switching circuit.

Figure 2 comprises a combination block-schematic diagram of an electronic switch which automatically switches between input 8 and input 9 in order to give indication of difference voltage existing between input 8 and input 9 as by alternate control of the sweep of a cathode ray tube, for example.

From sine wave generator 12, a signal is conveyed via lead 13 to amplifier 14 and from thence via lead 15 to clipper 16, yielding square wave S. Voltage of square wave S together with a biasing voltage from battery 17 is divided by voltage divider D, comprising resistors 18 and 19, and is applied to either grid 20 of electron tube $T_1$ or to grid 21 of electron tube $T_2$; thus either tube $T_1$ or $T_2$ conducts in accordance with polarity of square wave S; but both tubes $T_1$ and $T_2$ cannot conduct simultaneously because nature of square wave maintains grid of one tube above cutoff while grid of other tube is held below cut off. Thus an output voltage E is produced which consists of alternate reproductions of inputs $I_1$ and $I_2$. If signals from conductors 8 and 9 (Figure 1) are conveyed to inputs $I_1$ and $I_2$, respectively, and if output E is connected to trigger on oscilloscope via transformer N, then a visual indication of distortion will be provided.

It is to be understood that the invention is not limited to the embodiment herein described but that it encompasses all modifications and variations within the legitimate and valid scope of the appended claims.

What is claimed is:

1. In a distortion indicator particularly for determining the distortion introduced in complex audio or video signal waveforms by a given recording and reproducing process: a signal source having a single output; a recorder and reproducer assembly to be tested including a recording device, a movable recording medium positioned to receive signals thereon from said recording device, a reproducing device spaced from said recording device positioned in relation to said recording medium to reproduce recorded signals therefrom at a predetermined constant time period later than recorded on said medium; a time delay device; said signal source output connected directly to both the input of said recording device and the input of said time delay device; said time delay device having a delay time equal to the time of transit of said medium from said recording device to said reproducing device; an indicating device having two independent inputs; said indicator inputs being connected respectively to the output of said time delay device and the output of said reproducing device; whereby the original waveform and the recorded and reproduced waveform are simultaneously and synchronously presented to said indicating device for comparison.

2. Apparatus in accordance with claim 1 in which said recording device and said reproducing device are magnetic heads.

3. In a distortion indicator, an electronic switch having one output circuit and two input circuits, a time delay device having an output connected to one of said input circuits, a recording device having an input connected to the input of said time delay device, a reproducing device fixed in predetermined relation to said recording device and having an output connected to the other of said input circuits, a recording medium operatively associated with said recording device and said reproducing device, said recording medium adapted to be driven at a constant speed, the delay time of said time delay device equaling the transit time of said medium from said recording device to said reproducing device, and a signal source connected to the junction of inputs of said recording device and said time delay device, whereby the distortion of an input signal applied at the junction of the inputs of said recording device and said time delay device produced by recording and reproducing the signal can be ascertained by substantially simultaneous comparison at the output circuit of said electronic switch.

4. Apparatus in accordance with claim 3 in which an indicator device is connected to the output from said electronic switch.

5. Apparatus in accordance with claim 3 in which said recording device and said reproducing device are magnetic heads.

References Cited in the file of this patent

UNITED STATES PATENTS

| | | |
|---|---|---|
| 2,106,350 | Hickman et al. | June 25, 1938 |
| 2,378,383 | Arndt | June 19, 1945 |
| 2,416,353 | Shipman et al. | Feb. 25, 1947 |
| 2,446,479 | Begun | Aug. 3, 1948 |
| 2,628,346 | Burkhart | Feb. 10, 1953 |
| 2,647,169 | Blaney et al. | July 28, 1953 |
| 2,679,636 | Hillyer | May 25, 1954 |
| 2,700,755 | Burkhart | Jan. 25, 1955 |
| 2,756,409 | Lubkin | July 24, 1956 |